United States Patent
Mullen

(10) Patent No.: US 11,222,186 B2
(45) Date of Patent: Jan. 11, 2022

(54) SYSTEM AND METHOD FOR ACCURATE BULK SCANNING OF RFID TAGS

(71) Applicant: Andy L. Mullen, Dallas, GA (US)

(72) Inventor: Andy L. Mullen, Dallas, GA (US)

( * ) Notice: Subject to any disclaimer, the term of this patent is extended or adjusted under 35 U.S.C. 154(b) by 0 days.

(21) Appl. No.: 17/328,063

(22) Filed: May 24, 2021

(65) Prior Publication Data

US 2021/0365649 A1    Nov. 25, 2021

Related U.S. Application Data

(60) Provisional application No. 63/028,927, filed on May 22, 2020.

(51) Int. Cl.
*G06K 7/10* (2006.01)

(52) U.S. Cl.
CPC ..... *G06K 7/10425* (2013.01); *G06K 7/10158* (2013.01); *G06K 7/10356* (2013.01)

(58) Field of Classification Search
CPC .......... G06K 7/10425; G06K 7/10356; G06K 7/10158; G06K 7/10376; G06K 7/10079; G06K 7/10089; H01Q 1/2216; H01Q 1/526; H01Q 3/02; H01Q 3/08; H01Q 3/10; H01Q 1/42
USPC ... 340/10.1, 572.1, 757, 763, 764, 765, 766; 455/63.1, 278.1, 296, 300, 301
See application file for complete search history.

(56) References Cited

U.S. PATENT DOCUMENTS

| | | | | |
|---|---|---|---|---|
| 4,630,056 A | * | 12/1986 | Noguchi | H01Q 3/005 342/359 |
| 6,166,637 A | * | 12/2000 | Cyr | A01K 11/006 119/51.02 |
| 6,622,333 B1 | | 9/2003 | Rehkemper et al. | |
| 7,088,248 B2 | | 8/2006 | Forster | |
| 7,183,922 B2 | | 2/2007 | Mendolia et al. | |
| 7,187,288 B2 | | 3/2007 | Mendolia et al. | |
| 7,195,159 B2 | | 3/2007 | Sloan et al. | |
| 7,515,051 B2 | | 4/2009 | Wagner et al. | |
| 7,528,726 B2 | | 5/2009 | Lee et al. | |

(Continued)

FOREIGN PATENT DOCUMENTS

| | | |
|---|---|---|
| WO | 2016024617 A1 | 2/2016 |
| WO | 2019016593 A1 | 1/2019 |

*Primary Examiner* — Edwin C Holloway, III
(74) *Attorney, Agent, or Firm* — Richard Piercy; Grell & Watson Patent Attorneys LLC

(57) ABSTRACT

A system to accurately and consistently read Radio-Frequency Identification (RFID) information from RFID tags placed upon objects. The system features a moving antenna or antenna array pointed toward a target detection zone. In some embodiments, a portal is constructed having electromagnetic shielding properties and containers carrying RFID tagged objects are loaded through the portal. In other embodiments, multiple antenna arrays are installed within the portal. Movement of antenna arrays may be provided using a non-electronic motor or actuator to suppress potential electromagnetic interference. A method of accurately and consistently reading RFID information from RFID sources by providing the antenna(s) and portal passing objects having RFID tags proximate the antenna(s) and through the portal, and optimizing the angle by which the antennas and/or antenna arrays may best read the RFID signals upon a target detection zone via movement of the antenna(s).

20 Claims, 6 Drawing Sheets

(56) References Cited

U.S. PATENT DOCUMENTS

| | | | |
|---|---|---|---|
| 7,755,563 B2 * | 7/2010 | Berry | H01Q 1/088 |
| | | | 343/878 |
| 8,174,391 B2 * | 5/2012 | Sandler | H01Q 3/02 |
| | | | 340/572.7 |
| 8,296,000 B2 | 10/2012 | Denny et al. | |
| 8,717,145 B2 | 5/2014 | Ho et al. | |
| 8,870,069 B2 | 10/2014 | Bellows | |
| 9,013,307 B2 | 4/2015 | Hussain et al. | |
| 9,640,875 B2 | 5/2017 | Wilkinson et al. | |
| 10,234,494 B2 | 3/2019 | Jimenez et al. | |
| 10,476,153 B2 | 11/2019 | Anderson | |
| 2002/0183882 A1 * | 12/2002 | Dearing | G06Q 10/08 |
| | | | 700/115 |
| 2005/0168385 A1 * | 8/2005 | Baker | H01Q 1/1242 |
| | | | 343/700 MS |
| 2007/0241906 A1 | 10/2007 | Malik | |
| 2008/0061942 A1 | 3/2008 | Maniwa | |
| 2009/0015409 A1 * | 1/2009 | Cheung | G06K 7/10336 |
| | | | 340/572.1 |
| 2012/0169558 A1 * | 7/2012 | Huang | G01R 31/002 |
| | | | 343/766 |
| 2013/0113669 A1 | 5/2013 | Bellows | |
| 2014/0028523 A1 * | 1/2014 | He | G01R 29/0878 |
| | | | 343/882 |
| 2015/0015372 A1 * | 1/2015 | Hara | G06K 7/10316 |
| | | | 340/10.1 |
| 2015/0302708 A1 * | 10/2015 | Hattori | G06K 7/10009 |
| | | | 705/16 |
| 2016/0379021 A1 | 12/2016 | Bellows | |
| 2018/0375940 A1 | 12/2018 | Binder et al. | |

\* cited by examiner

SYSTEM AND METHOD FOR ACCURATE BULK SCANNING OF RFID TAGS

CROSS-REFERENCE TO RELATED APPLICATIONS

To the full extent permitted by law, the present U.S. Non-Provisional patent application hereby claims priority to and the full benefit of, U.S. Provisional application entitled "SYSTEM FOR SCANNING BULK RFID TAGS," having assigned Ser. No. 63/028,927, filed on May 22, 2020, which is incorporated herein by reference in its entirety.

FIELD OF THE DISCLOSURE

The present disclosure relates generally to the reading of radio frequency identification (RFID) tags. More specifically, the present disclosure is directed to systems and methods of accurately scanning large quantities of RFID tags through various improvements in electromagnetic isolation, antenna array orientation, and antenna movement.

BACKGROUND

Radio-Frequency Identification (RFID) tags are a well-known and near universally adopted means of automatically identifying and tracking objects without requiring a visible label (e.g., UPC). An RFID system consists of a small radio transponder (the tag), a radio receiver, and a transmitter. When triggered by an electromagnetic pulse from a nearby RFID reader device, the tag transmits digital data back to the reader. This data is usually an identifying number or an inventory number. Usually, these numbers are unique to each object, even if the objects are largely fungible. For instance, if a manufacturer were wanting to track hats which they manufacture across their entire supply chain, unique identifiers for each hat could be loaded into each tag, and upon reading could be logged or otherwise annotated in an inventory system. If one of the hats were to go missing, the manufacturer could easily pinpoint the last place in its logistic enterprise where the hat was logged and further investigate the problem. These RFID tags often assume a form factor similar to a label or even may be embedded into a literal "tag". Other uses include integration into the packaging or even the product/object itself. RFID tags typically comprise (i) an integrated circuit and (ii) one or more antennas. The integrated circuit typically carries out a variety of functions including modulating and demodulating radio frequency signals, data storage, and data processing. Some integrated circuits are self-powered (e.g., near-field communicators) while others are passive and would then be completely dependent upon an external power source to support their occasional functionality. Usually, this external power source is the RFID reader itself, which broadcasts an electromagnetic pulse, causing the RFID tag to broadcast its data. Given the utility of the technology and the inexpensive nature of the RFID tags themselves, it is no wonder they have been nearly universally adopted as a means of tracking and identifying goods over a certain price point. Even relatively inexpensive goods (e.g., books, digital media discs) often arrive at retailers with RFID tags contained therein and goods which are routinely serviced (e.g., institutional laundry) may be RFID tagged if only to track a service as it is being provided by a third-party (or provided by an internal business unit).

There are proposals to utilize RFID tags to individually identify individual items, in a systematic and universally recognizable way. Such systems usually establish a system and library for the assignment of codes to individual objects which can then assist the users of these systems to uniquely identify each tag and, by association, each item associated on a one-for-one basis. Using such a system, and to the extent that such proposed systems are already in use, have, will, or can create enormous benefits to companies with respect to inventory tracking, logistical optimization, process automation, and other benefits known to those skilled in the art.

The ability to read and then uniquely identify each item as it enters or leaves a commercial facility or other area (e.g., a manufacturer, a repair facility, a cargo container, a staging area, a transportation vehicle, a retailer, etc.) offers companies countless opportunities to not only to track, but to improve, optimize and even automate their processes. The ability to accurately read these RFID tags in bulk, comprises just one potential area of process improvement. In order to ensure count accuracy of all objects entering or leaving a facility, usually a process must first narrow the potential entry/exit points down to that which RFID readers may be deployed. The expense of an RFID reader in conjunction with the number of entrances may be the only limiting factors here. Given controlled and relatively narrow and confined point-of-access (e.g., a loading dock where trucks are unloaded), companies can be relatively assured that all objects bearing RFID tags and passing through the RFID scanner will be counted upon entry. However, in certain commercial, manufacturing, logistical, and industrial settings, even if these entry points are relatively small, the arrangement of objects passing through such an entry/exit point may cause certain inaccuracies, due to inherent limitations of the RFID technology, interference of electromagnetic energy found in real-world settings, and unpredictable arrangement of objects as they pass through any given entry/exit point.

While successful and effective in theory or industrial laboratory settings, many approaches to achieve count accuracy approaching 100% often fail in real-world practice. One example, failure to isolate and/or shield RFID readers from RFID tags which may be activated near, but not passing through, an entry/exit may cause that RFID tag to be counted multiple times throughout the course of an operational day. In other words, any number of objects bearing RFID tags and stored near an entry/exit may be counted redundantly, thereby causing an overcount or multiple redundant count of an object which may never have even entered or exited the building on a particular day. This can cause errors in logs, might require manual review/oversight, and may cause a company to abandon storage within otherwise perfectly suitable and even convenient or optimal square footage. Other examples of implementations with shortfalls include portals having electromagnetic shielding with numerous RFID tag scanning antennas. In addition to the shortfall that these portals and their numerous RFID tag scanning antennas may be prohibitively expensive to assemble, they may also lack the ability to achieve a wide number of angles of activation and signal capture due to the antennas being fixed in place, meaning the number of angles may be limited by the number of antennas.

In another example, the arrangement of objects as they enter or leave a facility may have a substantial effect on whether RFID readers achieve an accurate count of objects. Orientation, specifically with respect to the orientation between any particular RFID tag and the antenna of an RFID reader, has been shown to be important to whether a passive RFID tag is activated by the electromagnetic pulse of the reader and whether the RFID reader receives the data then broadcasted from the tag. Certain angles of orientation or arrangement techniques may be optimal for some of the objects during a bulk scan, but not others. For instance, in the case of finished, packaged, and palletized electronic devices bearing RFID tags, all tags may be oriented parallel or perpendicular to a floor. In such a situation, an industrial engineer or other individual skilled in the art may be able to identify the optimal angle for an antenna of an RFID reader to receive a bulk count approaching 100% accuracy. However, should certain objects (e.g., the electronics within the boxes) or other RFID tags on the pallet block certain deeply stored palleted objects, all objects may not be counted without the need for an arrayed antenna for an RFID reader or several RFID reading antennas across several RFID readers. In a less organized example, if a facility were receiving loads of donated books destined for processing and shipment, the arrangement may not be so neatly oriented. Even if certain objects within the tagged containers did not interfere magnetically, the random orientation of RFID tags may cause an inaccurate count, or miss an unacceptable number during processing. In each of these examples, economic costs may be borne in a variety of forms. By way of example and not limitation, these may include additional labor to scan, additional labor to manually verify by hand-count, inaccurate inventory shrink reporting, missed invoicing of services, opportunities for theft, the like, and/or combinations thereof. In the case of a facility which relies on accurate counting of textile materials to be accepted from a client, laundered and returned to a client, low counts at any percentage may substantially affect the bottom-line and may force a company to require higher prices on quotes on a per-item basis than their competitors who are able to accurately count the materials they receive. Therefore, automated and accurate counting in this specific industry, as in other industries, may offer a competitive advantage. If such a company could rely on having near 100% accurate automated counts, it could offer lower prices to its customers on a per-item basis while also being able to make more profit on each item, since their competitors may have to assume a certain undercounting.

The instant disclosure may be designed to address at least certain aspects of the problems or needs discussed above by providing a system and method for the accurate bulk-scanning of RFID tags.

SUMMARY

The present disclosure may solve the aforementioned limitations of the currently available RFID bulk scanning devices by providing a system and method for the accurate bulk-scanning of RFID tags. Such a system and method may be thought of as having three broad categories of improvement: (i) focused antenna array(s) (ii) capable of radio-silent movement (iii) isolated from surrounding electromagnetic interference. Alone and in combination, each serves to increase the accuracy of bulk-scanning systems and methods currently in use in manufacturing, logistics, shipping, receiving, industrial processing, consumer retail, and other facilities in need of accurately counting objects entering and leaving a facility.

Accordingly, in one aspect, the system for the accurate bulk-scanning of RFID tags includes an at least one antenna. This at least one antenna may form an antenna array, each antenna having an angle specific to a proposed structure or container having a bulk number of objects contained within it and bearing RFID tags. The at least one antenna may be capable of sending an electromagnetic pulse toward such a container, activating the RFID circuits, then capable of receiving the data stored therewithin the RFID tags, usually a unique object identifier. The area which a container may be oriented with respect to one or more of the at least one antenna may be henceforth referred to as "the container area".

In a potentially preferred embodiment of this aspect, the at least one antenna is actually three antenna arrays: (i) a first antenna array to one side of the container area, (ii) a second antenna array to the other side of the container area, and (iii) a third antenna array to the top of the container area. Each antenna array may feature a first antenna oriented directly facing and centered upon the container area and two offset antennas a specific distance from the first antenna and having an angle orientation such that its focus is still upon the container area (i.e., each antenna face is angled toward the center antenna).

In another aspect, the system for the accurate bulk-scanning of RFID tags may include a radio-silent mechanism for movement of the at least one antenna. Though many radio-silent mechanisms are contemplated herein, pneumatic and/or hydraulic actuators may offer optimization along simplicity, maintenance, and economic concerns. Depending on proposed container areas, movement may be achieved in any number of directions including but not limited to spinning, sliding, revolving, rotating, zig-zag, and/or random orbital. Movement of the at least one antenna may be preferable to obtain an increased number of angles over a stationary at least one antenna. The radio silence may offer the additional benefit of minimizing sources of electromagnetic interference with both the activation pulse and data transmission to/from the RFID tags.

In a potentially preferred embodiment of this aspect, the radio-silent mechanism for movement may be rotation of the potentially preferred embodiment of the at least one antenna around each center antenna at its center via a pneumatic rotary actuator. In this embodiment, each offset antenna may be connected along a moving/articulating arm, the center antenna pivoting on its center during movement. Furthermore, the pneumatic rotary actuator may rotate and/or spin the antenna array arm through any number of proposed radian/degree movements, including but not limited to 90°, 180°, 270°, 360°, interceding degrees and multiples thereof. Depending on type of objects, type of containers, and accuracy needed, smaller rotational angles may be preferable to conserve power (in the case of a compressor powered pneumatic system) or compressed air (in the case of a tank-powered system. Furthermore, large angles may be redundant assuming a motionless container and three-antenna array arm (i.e., at 180°, substantially all angles may be covered, and with a 3-array system, even 90° may suffice).

In yet another aspect, the system for the accurate bulk-scanning of RFID tags may include a portal capable of electromagnetic interference reduction and/or isolation. Such a portal may be as simple as a metal enclosure having an entry door and an exit door, each of metal, in combination with a solid (e.g., concrete) floor. When a container is placed in a container area of the disclosure, the doors of the portal are shut, the system for bulk-scanning RFIDs may be activated. Such isolation may prevent nearby RFIDs not intended to be counted as well as other electromagnetic interreference from entering the portal, thereby both preventing over-count of errant RFIDs and undercounting those RFIDs susceptible to outside electromagnetic interference, for whatever reason that may be. Other incarnations of this aspect may include faraday cages, concrete, other electromagnetic shielding designs, the like, and/or combinations thereof, in addition to configurations with more and/or fewer means of ingress/egress. Additionally, motion into and out of the portal may be automated via an additional system (e.g., robotic device, conveyor belt, etc.). Those skilled in the art of automation, industrial design, etc. may implement additional improvements to this type of structure which may have specific benefits to each individual application of this disclosure.

In an exemplary embodiment of the portal capable of electromagnetic interference reduction and/or isolation, the portal structure may have an ingress side having a door, an egress side having a door, two sides connecting the ingress and egress sides, a roof and a floor. The ingress, egress, two connecting sides, roof and doors may each be constructed of metal in this embodiment. The floor may be constructed of concrete. Internally, the preferred embodiments of both the at least one antenna and the radio-silent mechanism for movement may be installed thereon the two connecting sides and the roof. In a potential improvement of this embodiment, covers made of non-isolating materials (e.g., plastic, wood, fiberglass, composite) may be installed to protect and/or conceal the at least one antenna. These panels may serve the benefit of both concealing the antennas, protecting them from damage, and may offer easy access for maintenance and/or cleaning.

In another aspect, the method for the accurate bulk-scanning of RFID tags may include installation of the at least one antenna aspect, the radio-silent mechanism for movement, and the portal structure in accordance with the disclosure, followed by a series of steps to count the RFID objects contained within a container. In a proposed potentially preferred embodiment of this method of the disclosure, the ingress door may be opened, the container placed inside, the ingress and egress doors may then be closed, the RFID scanner (the at least one antenna) may be activated, causing the rotary(s) actuator to move, then causing each RFID tag to be activated and transmit to the RFID scanner (the at least one antenna) the identifier data, which may then be processed by a system to log the identities and/or numbers of objects for an intended use. then the egress door may be opened, the container removed, and the process/method may be repeated for other containers.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-6, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples. By way of example, an antenna may be a single RFID scanning device or several arranged and/or mounted on an apparatus, which may also be referred to as an antenna array. Though one non-electronic motor may be thoroughly described to drive certain components and movement of the system of the disclosure, many non-electronic motors are contemplated herein including but not limited to heat engines (e.g., internal combustion, steam), external pressure driven (e.g., hydraulic, pneumatic), and wind-up (e.g., those found in a clock or watch). Additionally, known techniques to isolate/minimize/eliminate any electronic/electromatic interference caused by the use of an electronic motor are also herein contemplated, including but not limited to low-power motors and electromagnetic shielding. The motor described in some embodiments of the disclosed system may be referred to as pneumatic rotary actuator, pressure-driven rotary actuator, rotary actuator, actuator, motor, the like, and/or combinations and variations thereof.

The present disclosure solves the aforementioned limitations of the currently available devices, platforms, systems and methods of bulk-scanning RFID tags by providing a series of improvements to such a system, each of which solves a particular problem to increase accuracy of bulk-scanning while preserving automation. By arranging a system according to the principles of electromatic isolation and angular electromagnetic optimization via movement, 100% accuracy of capture of RFID information may be approached and even achieved.

Figure 1:
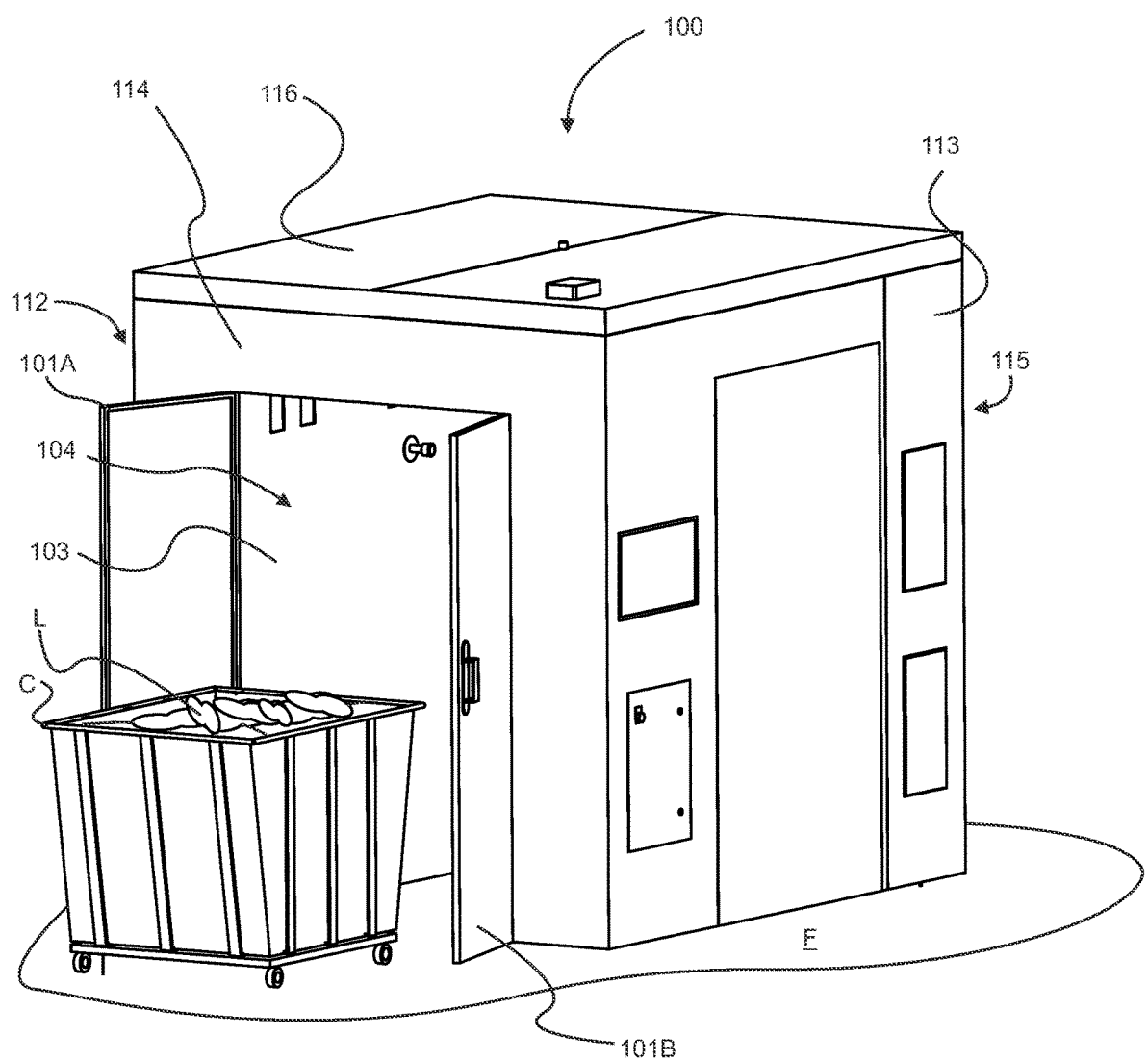
FIG. 1 is a perspective drawing of an exemplary embodiment of the system of the disclosure.

Referring now specifically to FIG. 1, therein illustrated is a perspective drawing of an exemplary embodiment of the system of the disclosure. Generally, the system of the disclosure may feature portal 100, which features various aspects. Portal 100 may be installed upon floor F, wherein container C is illustrated as having a payload of laundry L loaded therein, and container C is awaiting entry into portal 100. Floor F may be constructed of any number of suitable flooring materials, including but not limited to concrete, metal, tile, laminate, the like and/or combinations thereof.

Benefits may be achieved using a flooring which features electromagnetic shielding properties, such as concrete or metal. Container C may be a rolling cart or any container or portable/movable surface upon which objects reside or rest. By way of example and not limitation, container C could be a laundry cart or it could be any number of types of carts. It is herein contemplated that container C could be another type of container or palletized objects, boxes, freight, the like and/or combinations thereof. Importantly, container C, or cart/pallet variations thereof, contains objects featuring RFID tags, illustrated herein as laundry L. Laundry L may have RFID tags sewn into, sewn onto, adhered, or otherwise attached to each individual article of laundry L. Similarly, other items within container C, or cart/pallet variations thereof, may have RFID tags similarly attached or adhered to each object contained in/on container C.

Referring now more specifically to the parts and features of portal 100 of FIG. 1, therein illustrated is portal 100 having left internal panel 103, right internal panel (not shown), internal roof panel (not shown), portal external ingress panel 114 having portal ingress opening 104, portal external egress panel 115 having portal egress opening 105 (see FIG. 3), first external portal connecting side panel 112 (which may be understood as left external portal side panel), second external connecting side panel 113 (which may be understood as left external portal side panel), and portal external roof panel 116. Connected to each of said portal external ingress panel 114 and portal external egress panel 115 may be portal doors 101*a* and 101*b*. As illustrated, these doors open at the center of portal ingress opening 104, and are attached at each side of portal ingress opening 104 to portal external ingress panel 114, but the disclosure is not so limited. Behind each of said left internal panel 103, right internal panel, and internal roof panel may be antenna 410 (or left antenna 412, right antenna 413, and top antenna 411, respectively), which are covered in greater detail in FIGS. 2-5.

Importantly, construction material choices for these features and components of portal 100, namely each respective panel, may increase the utility, with respect to RFID signal penetration and electromagnetic shielding, enhancing portal 100's ability to accurately detect RFID tags. One skilled in the art may observe a grouping of internal panels and external panels to determine appropriate choices of materials. Left internal panel 103, right internal panel, and internal roof panel may be constructed of materials generally known for their electromagnetic transparency. It should be noted that the primary utility of left internal panel 103, right internal panel, and internal roof panel may primarily be concealing and protecting the moving electronic components behind each panel. Therefore, portal 100 may function normally absent these internal panels. If present, suitable construction materials for left internal panel 103, right internal panel, and internal roof panel may include but are not limited to plastic, wood, plexiglass, glass, composite materials (e.g., fiberglass or carbon fiber), drywall, the like and/or combinations thereof. Left internal panel 103, right internal panel, and internal roof panel may include permanently secured components in addition to removeable panels, and left internal panel 103, right internal panel, and internal roof panel may preferably be entirely removeable to allow for maintenance of the components which they conceal/protect. External panels and doors, including portal external ingress panel 114, portal external egress panel 115 (see FIG. 3), first external portal connecting side panel 112, second external connecting side panel 113, portal external roof panel 116, and portal doors 101A and 101B may be generally constructed of materials which feature electromagnetic shielding properties. These materials may include sheet metals (e.g., steel, copper, aluminum, zinc, nickel), metal mesh, or some combination of non-shielding materials combined with a shielding material (e.g., a metal mesh faraday cage installed within plaster or concrete). In combination with floor F, with portal doors 101A and 101B closed, the inside of portal 100 should be substantially shielded from electromagnetic waves/radiation during operation, should one skilled in the art desire to maximize accuracy of the RFID system of the disclosure.

Figure 2:
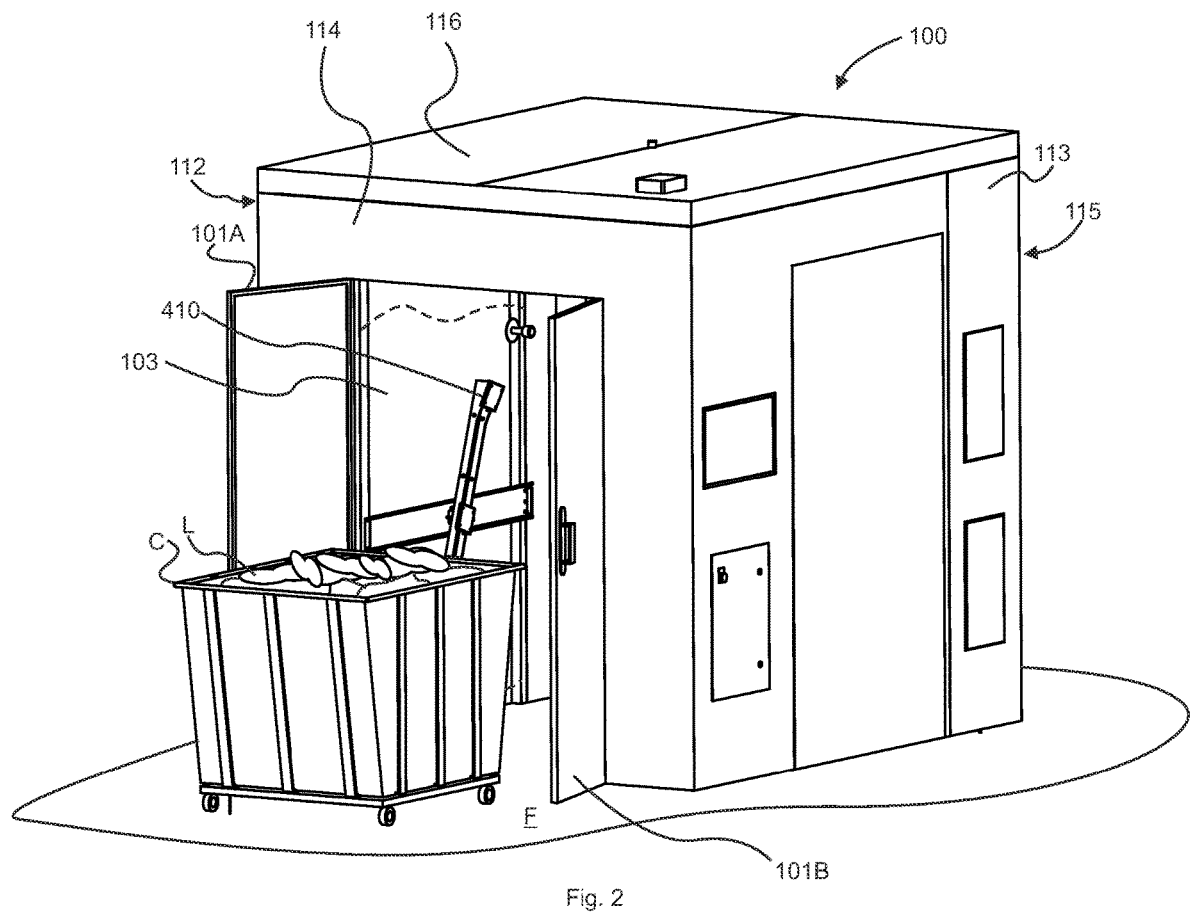
FIG. 2 is a perspective drawing of an exemplary embodiment of the system of the disclosure having a cutaway view showing an exemplary at least one antenna.

Referring now specifically to FIG. 2, therein illustrated is a perspective drawing of an exemplary embodiment of the system of the disclosure having a cutaway view showing an exemplary at least one antenna 410 (here illustrated as left antenna 412). Generally, the system of the disclosure may feature portal 100, which features various aspects. Portal 100 may be installed upon floor F, wherein container C is illustrated as having a payload of laundry L loaded therein, and container C is awaiting entry into portal 100. Importantly, container C, or cart/pallet variations thereof, contains objects featuring RFID tags, illustrated herein as laundry L. Portal 100 may feature left internal panel 103 (shown cutaway), right internal panel (not shown), internal roof panel (not shown), portal external ingress panel 114 (or front panel) having portal ingress opening 104, portal external egress panel 115 (or rear panel) having portal egress opening 105 (see FIG. 3), first external portal connecting side panel 112, second external connecting side panel 113, and portal external roof panel 116. Connected to each of said portal external ingress panel 114 and portal external egress panel 115 may be portal doors 101A and 101B. Behind each of said left internal panel 103, right internal panel, and internal roof panel may be antenna 410 (or left antenna 412, right antenna 413, and top antenna 411, respectively), which are individually covered in greater detail in FIG. 3. Generally, each antenna 410 may be constructed of multiple RFID reading antennas connected to a single RFID reader placed in a location desirable to create a target detection zone, the important aspects of which will be more apparent upon review of FIGS. 4*a*, 4*b*, and 5. Various features of antenna 410 may also be of interest to one skilled in the art and are therein described. Importantly, as illustrated herein FIG. 2, antenna 410 is an antenna array which features a center RFID reading antenna and two offset RFID reading antennas angled inward at a focus point centrally located within portal 100. These RFID antennas may alternatively be thought of as independent antennas or sub-antennas of antenna 410, and antenna 410 connected to a single RFID reader or an RFID reading system. When container C having laundry L (or another payload of RFID tagged objects) is placed therein portal 100, portal doors 101A and 101B may be closed in order to then cause antenna 410 to be activated, which may cause the cascade effect of activating RFID tags therein laundry L to transmit identification signals/data back to antenna 410.

Figure 3:
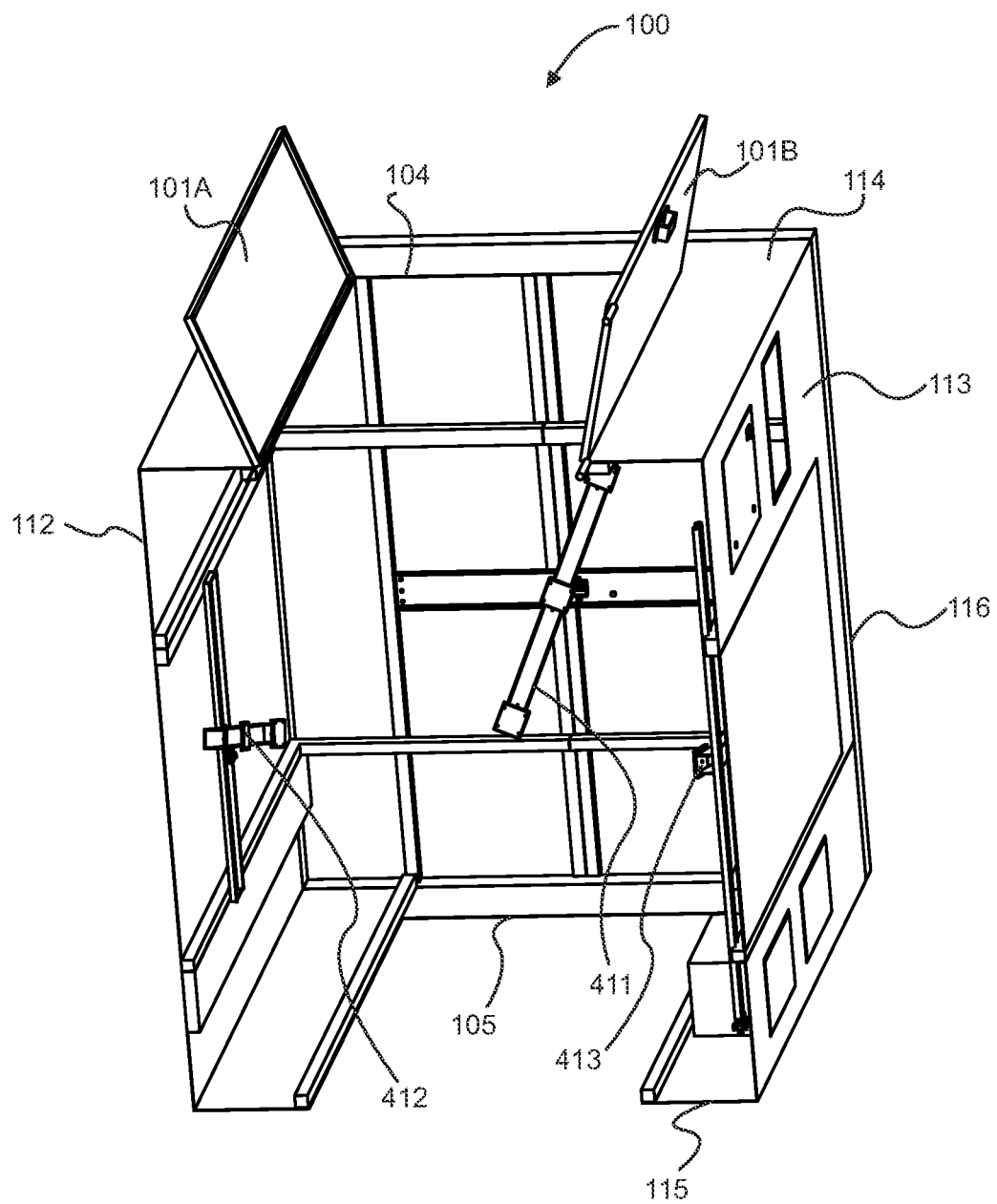
FIG. 3 is a perspective drawing of an exemplary embodiment of the system of the disclosure without the exemplary protective panels to show various views of exemplary antennas.

Referring now specifically to FIG. 3, therein illustrated is a perspective drawing of an exemplary embodiment of the system of the disclosure without the exemplary protective panels to show various views of exemplary antennas. The perspective view is disassembled of internal panels of portal 100 and shown from below to expose and better illustrate the arrangement of top antenna 411, left antenna 412, and right antenna 413. Also illustrated therein are other features of the disclosed system including portal 100, which features various aspects. Portal 100 may feature left internal panel 103 (not shown), right internal panel (not shown), internal roof panel (not shown), portal external ingress panel 114 having portal ingress opening 104, portal external egress panel 115 having portal egress opening 105, first external portal connecting side panel 112, second external connecting side panel 113, and portal external roof panel 116. Connected to each of said portal external ingress panel 114 and portal external egress panel 115 may be portal doors 101A and 101B (see FIGS. 1-2). Behind each of said left internal panel 103, right internal panel, and internal roof panel may be left antenna 412, right antenna 413, and top antenna 411, respectively. Generally, left antenna 412, right antenna 413, and top antenna 411 may be each an antenna array constructed of multiple RFID reading antennas connected to an RFID reader and placed in a location desirable to create a target detection zone, the important aspects of which will be more apparent upon review of FIGS. 4a, 4b, and 5. Various features of left antenna 412, right antenna 413, and top antenna 411 may also be of interest to one skilled in the art and are therein described. Importantly, as illustrated herein FIG. 3, left antenna 412, right antenna 413, and top antenna 411 are each illustrated as antenna arrays which each feature a center RFID reading antenna and two offset RFID reading antenna angled inward at a focus point centrally located within portal 100, each of these antennas and/or antenna arrays connected to an RFID reader, or in a perhaps preferred embodiment, all may be connected to a single RFID reader. These RFID reading antennas may be thought of as sub-antennas of each of left antenna 412, right antenna 413, and top antenna 411, and left antenna 412, right antenna 413, and top antenna 411 may then each be thought of as either a single antenna having a plurality of sub-antennas or as antenna arrays, each featuring a plurality of antennas. When container C having laundry L (or another payload of RFID tagged objects) is placed therein portal 100, portal doors 101A and 101B may be closed in order to then cause left antenna 412, right antenna 413, and top antenna 411 to be activated, which may cause the cascade effect of activating RFID tags therein laundry L to transmit identification signals/data back to left antenna 412, right antenna 413, and/or top antenna 411. Additionally, as described and illustrated in further detail below, left antenna 412, right antenna 413, and top antenna 411 may each feature movement, which may further enhance each of left antenna 412, right antenna 413, and top antenna 411 to receive RFID information from all objects contained in container C, thereby more accurately counting RFID tags contained therein.

Figure 4A:
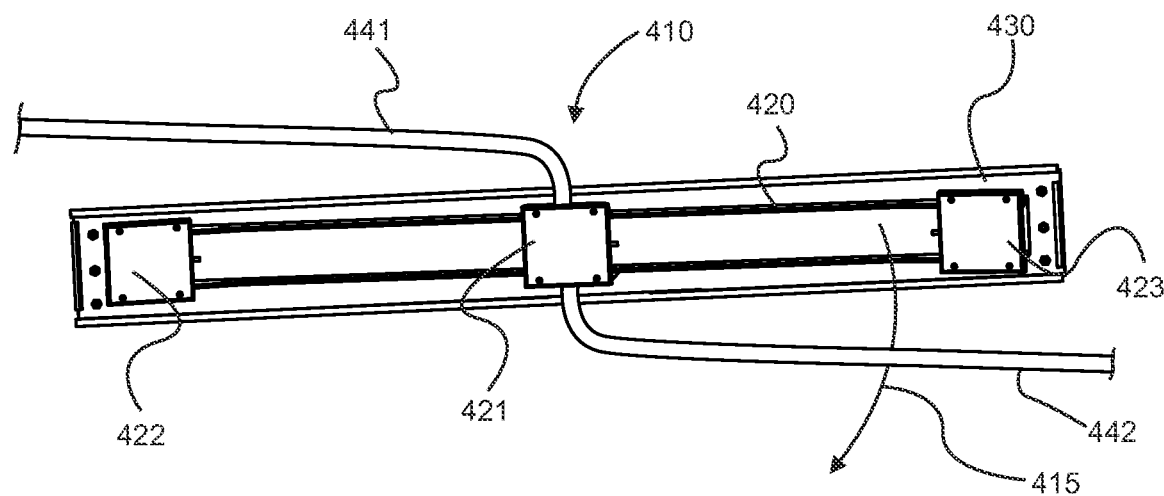
FIG. 4A is an elevation view of an exemplary at least one antenna and radio-silent movement mechanism.
Figure 4B:
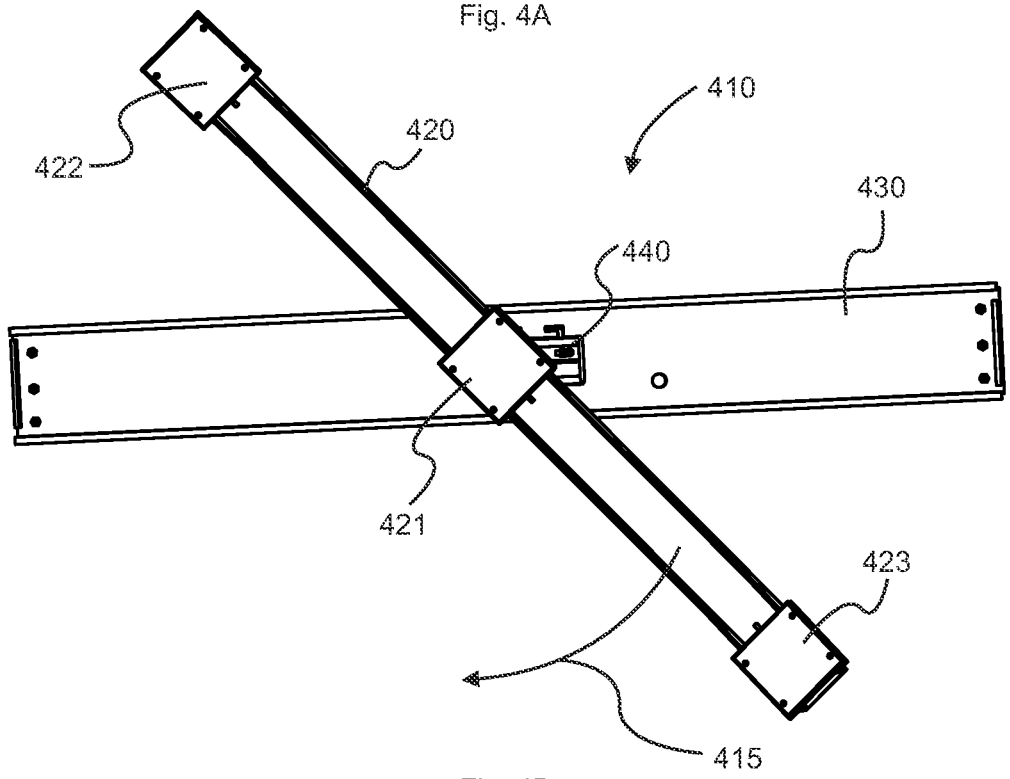
FIG. 4B is another elevation view of an exemplary at least one antenna and radio-silent movement mechanism, the antenna in movement.
Figure 5:
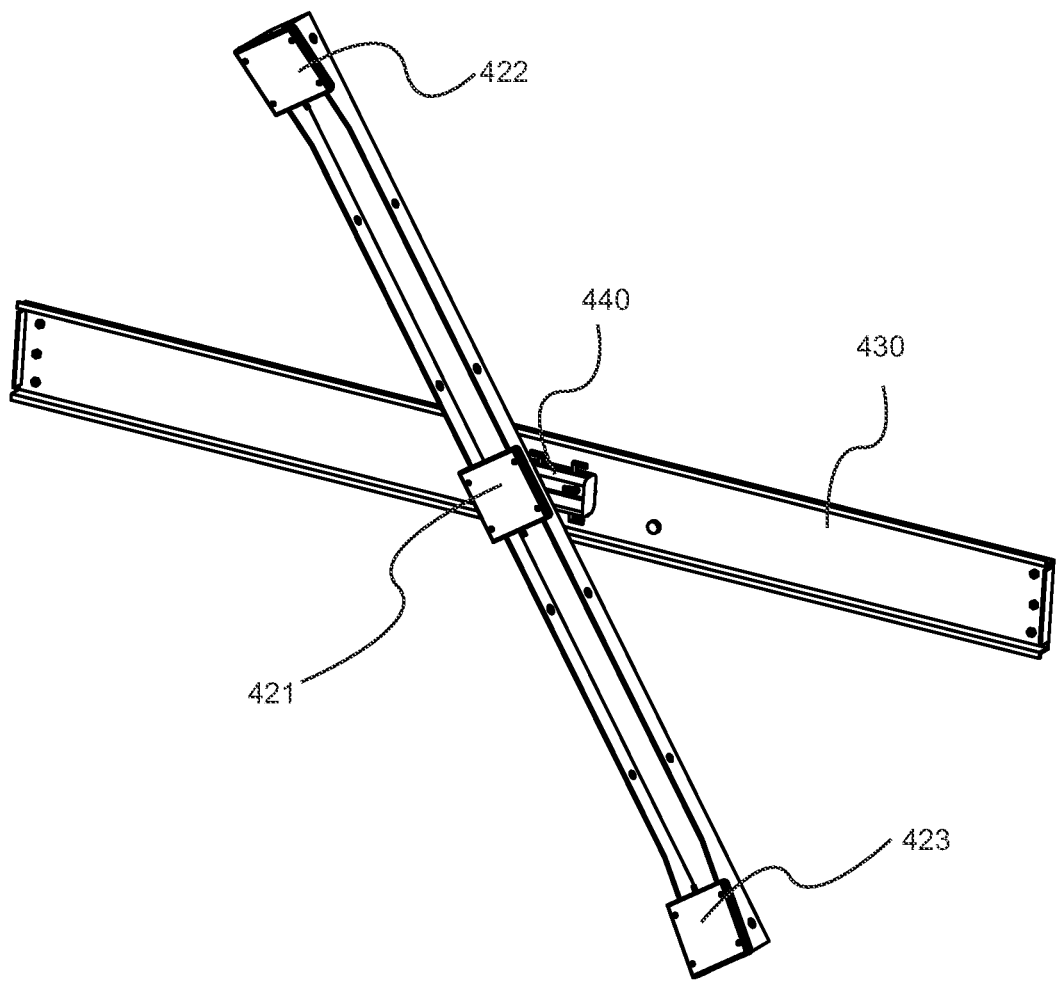
FIG. 5 is a perspective view of an exemplary at least one antenna and radio silent movement mechanism, the antenna in movement.

Referring now specifically to FIG. 4A, therein illustrated is an elevation view of an exemplary at least one antenna 410, which may be understood as an antenna assembly, and radio-silent movement mechanism, namely, in an exemplary embodiment, pressure driven rotary actuator 440 (see FIGS. 4B, 5). Antenna 410 may also be understood to be an apparatus for the reading of RFID tags. Antenna 410 may comprise one or more of the elements of center antenna 421 with left array antenna 422 to its left some distance and right antenna 423 to its right some distance, each array antenna which may be mounted to antenna arm 420 (also understood as articulating antenna arm, articulating arm, or just arm) which may be mounted to pressure driven rotary actuator 440 (see FIGS. 4B, 5) and fixed mount 430. Shown connected behind center array antenna 421 may be each of tube 441 and wire 442 which may connect to pressure driven rotary actuator 440 and antenna 410 (or center array antenna 421, left array antenna 422, and right array antenna 423), respectively. It should be understood by those skilled in the art that tube 441 may be constructed of any material suitable of delivering and maintaining liquid and/or gas pressure from a pressure source (not shown) to pressure driven rotary actuator 440. Upon delivery of liquid and/or gas from a pressure source upon activation to pressure driven rotary actuator 440, pressure driven rotary actuator 440 may be actuated and/or activated to cause antenna movement 415. Fixed mount 430 and antenna arm 420 may each be constructed of any rigid material, and fixed mount 430 may be connected in a fixed position within interior of portal 100. In use, a signal may be transmitted via wire 442 to cause center array antenna 421, left array antenna 422, and right array antenna 423 to begin detecting and transmitting information relevant to RFID tags within its zone of detection or target area. Separately or in conjunction with this signal, pressure may be released into tube 441, causing pressure driven rotary actuator 440 to activate and move antenna arm 420 in the direction of antenna movement 415. As one of ordinary skill in the art may understand, a benefit of pressure driven rotary actuator 440, or any similar device which can cause movement absent electrical signaling or power, may be the lack of electromagnetic interference or electromagnetic radiation (EMR) such a system can embody while simultaneously providing movement. Since RFID tags and RFID antennas may best interact at specific powers, distances, and angles, movement within the devices of antenna 410 may increase fidelity with respect to each individual RFID tag and the devices of antenna 410, namely center array antenna 421, left array antenna 422, and right array antenna 423. Further benefits may be achieved by optimizing distances between center array antenna 421, left array antenna 422, and right array antenna 423, and the respective angles each of center array antenna 421, left array antenna 422, and right array antenna 423 are positioned along antenna arm 420. In a perhaps optimal embodiment, several of antenna 410 may be placed within portal 100, utilizing distances between center array antenna 421, left array antenna 422, and right array antenna 423 and respective angles thereof to achieve a target detection zone optimal to container C, depending on specific or general characteristics thereof. Finally, one skilled in the art would understand that tube 441 and wire 442 are illustrated herein for exemplary purposes only. Tube 441 and wire 442 may be a series of tubes or series of wires, respectively, connected to each of pressure driven rotary actuator 440 and antenna 410 (or center array antenna 421, left array antenna 422, and right array antenna 423), respectively. Similarly, tube 441 and wire 442 may be concealed, installed in a different direction(s), may penetrate through a panel of portal 100 in a manner which it would not be visible as illustrated herein, or may otherwise connect to a device or pressure source proximate antenna 410. Importantly, wire 442 may be a wireless connection to a device for recording RFID information, though wireless communication active within the electromagnetic spectrum may be counterproductive to the intent of the present disclosure.

Referring now specifically to FIG. 4B, therein illustrated is an elevation view of an exemplary at least one antenna 410 and radio-silent movement mechanism, namely, in an exemplary embodiment, pressure driven rotary actuator 440, with antenna 410 illustrated during antenna movement 415. Antenna 410 may comprise one or more of the elements of center array antenna 421 with left array antenna 422 to its left some distance and right array antenna 423 to its right some distance, each array antenna which may be mounted to antenna arm 420 which may be mounted to pressure driven rotary actuator 440 (see also FIG. 5) and fixed mount 430. Connected behind center array antenna 421 may be each of tube 441 and wire 442 (see FIG. 4A) which may connect to pressure driven rotary actuator 440 and antenna 410 (or center array antenna 421, left array antenna 422, and right array antenna 423), respectively. It should be understood by those skilled in the art that tube 441 may be constructed of any material suitable of delivering and maintaining liquid and/or gas pressure from a pressure source (not shown) to pressure driven rotary actuator 440. Upon delivery of liquid and/or gas from a pressure source upon activation to pressure driven rotary actuator 440, pressure driven rotary actuator 440 may be actuated and/or activated to cause antenna movement 415. The example angle illustrated herein is approximately 45° from its starting point in FIG. 4A, though this radial angle may be any greater or lesser angle known to those skilled in the art. Speed of movement may be important to RFID reading and the fidelity thereof, so adjustments and fine-tuning may be necessary to achieve optimal reading and fidelity, in addition to optimal angling and movement of antenna arm 420. Fixed mount 430 and antenna arm 420 may each be constructed of any rigid material, and fixed mount 430 may be connected in a fixed position within interior of portal 100. In use, a signal may be transmitted via wire 442 to cause center array antenna 421, left array antenna 422, and right array antenna 423 to begin detecting and transmitting information relevant to RFID tags within its zone of detection or target area. Separately or in conjunction with this signal, pressure may be released into tube 441, causing pressure driven rotary actuator 440 to activate and move antenna arm 420 in the direction of antenna movement 415.

Referring now specifically to FIG. 5, therein illustrated is a perspective view of an exemplary at least one antenna 410 and radio-silent movement mechanism, namely, in an exemplary embodiment, pressure driven rotary actuator 440, with antenna 410 illustrated during antenna movement 415. Antenna 410 may comprise one or more of the elements of center array antenna 421 with left array antenna 422 to its left some distance and right array antenna 423 to its right some distance, each array antenna which may be mounted to antenna arm 420 which may be mounted to pressure driven rotary actuator 440 (see also FIG. 5) and fixed mount 430. Connected behind center array antenna 421 may be each of tube 441 and wire 442 (see FIG. 4A) which may connect to pressure driven rotary actuator 440 and antenna 410 (or center array antenna 421, left array antenna 422, and right array antenna 423), respectively. It should be understood by those skilled in the art that tube 441 may be constructed of any material suitable of delivering and maintaining liquid and/or gas pressure from a pressure source (not shown) to pressure driven rotary actuator 440. Upon delivery of liquid and/or gas from a pressure source upon activation to pressure driven rotary actuator 440, pressure driven rotary actuator 440 may be actuated and/or activated to cause antenna movement 415. The example angle illustrated herein FIG. 5 is again approximately 45° from its starting point in FIG. 4A, though this radial angle may be any greater or lesser angle known to those skilled in the art. Speed of movement may be important to RFID reading and the fidelity thereof, so adjustments and fine-tuning may be necessary to achieve optimal reading and fidelity, in addition to optimal angling and movement of antenna arm 420. Fixed mount 430 and antenna arm 420 may each be constructed of any rigid material, and fixed mount 430 may be connected in a fixed position within interior of portal 100. In use, a signal may be transmitted via wire 442 to cause center array antenna 421, left array antenna 422, and right array antenna 423 to begin detecting and transmitting information relevant to RFID tags within its zone of detection or target area. Separately or in conjunction with this signal, pressure may be released into tube 441, causing pressure driven rotary actuator 440 to activate and move antenna arm 420 in the direction of antenna movement 415. Since RFID tags and RFID antennas may best interact at specific powers, distances, and angles, movement within the devices of antenna 410 may increase fidelity with respect to each individual RFID tag and the devices of antenna 410, namely center array antenna 421, left array antenna 422, and right array antenna 423. Further benefits may be achieved by optimizing distances between center array antenna 421, left array antenna 422, and right array antenna 423, and the respective angles each of center array antenna 421, left array antenna 422, and right array antenna 423 are positioned along antenna arm 420. In a perhaps optimal embodiment, several of antenna 410 may be placed within portal 100, utilizing distances between center array antenna 421, left array antenna 422, and right array antenna 423 and respective angles thereof to achieve a target detection zone optimal to container C, depending on specific or general characteristics thereof. As illustrated herein FIG. 5, center array antenna 421 may be angled parallel to antenna arm 420 and fixed mount 430 so as to face directly the center of a proposed target detection zone. Furthermore, left array antenna 422 may be placed leftward of center array antenna 421, but angled slightly inward toward center to again meet a hypothetical target detection zone. Finally, right array antenna 423 may be placed rightward of center array antenna 421 and again, angled slightly inward toward center, with its face pointing in the same direction as left array antenna 422, but the inverse angle with respect to antenna arm 420.

Figure 6:
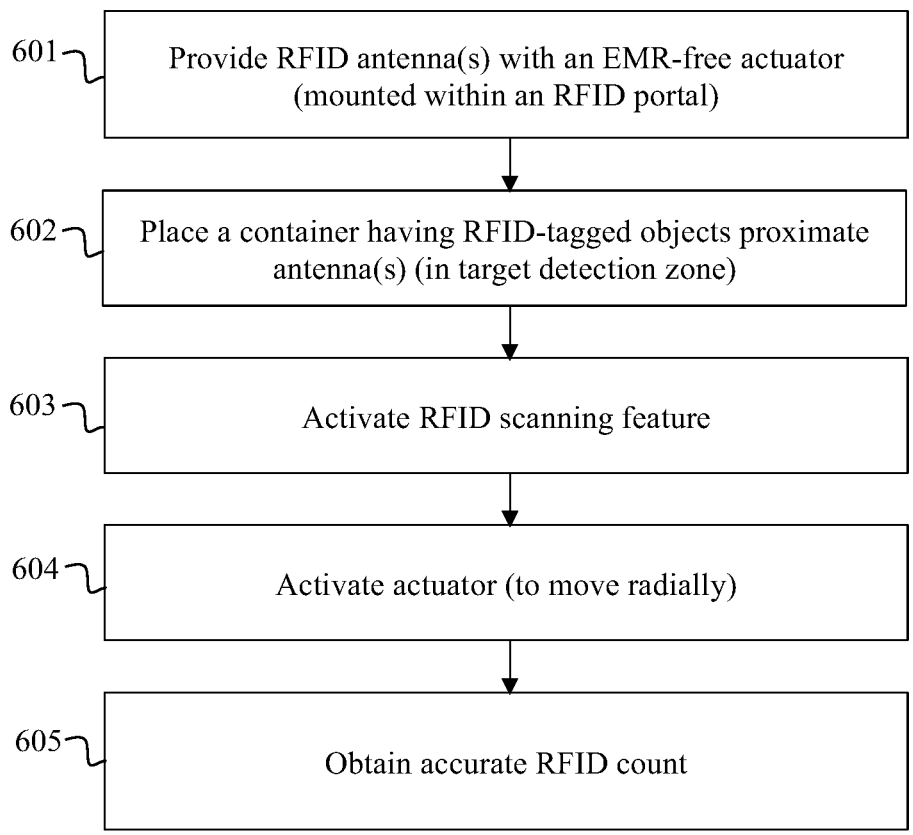
FIG. 6 is a flowchart of an exemplary method for the accurate bulk-scanning of RFID tags.

Referring now specifically to FIG. 6, therein illustrated is a flowchart of an exemplary method for the accurate bulk-scanning of RFID tags. Beginning at first method step 601, one or more antenna 410 is provided and optionally mounted within portal 100. At second method step 602, container C having RFID-tagged objects therein are placed proximately antenna 410 or optionally within a target detection zone of portal 100. Then, at third method step 603, an RFID scanning feature is activated to cause antenna 410 to activate and capture RFID information stored thereon tags of RFID-tagged objects. Next or simultaneously with third method step 603, at fourth method step 604, pressure driven rotary actuator 440 may be activated to move antenna 410, optionally and perhaps in a preferred embodiment, antenna movement 415 is in a radial direction. Finally, in connection with a device capable of receiving RFID information from an RFID scanner, at fifth method step 605, an accurate RFID count of RFID-tagged objects within container C may be obtained. During this method or process, it may be beneficial to add a variety of steps that would further increase the utility of the method of the disclosure. These may include by way of example and not limitation closing portal doors 101A and 101B prior to third method step 603.

In order to validate the performance of exemplary systems and methods of the instant disclosure, a comparative experiment was designed to test them against a prior art system and method. At a facility known to commonly monitor laundry L intake, five carts, resembling container C, were randomly chosen, each cart having stored therein various quantities of individual pieces of laundry L, each individual piece having an RFID tag. Each container C having varying densities of laundry L were randomly chosen at a facility known to commonly monitor laundry L intake via container C. Each container C was then scanned using a preferred embodiment portal and antenna arrangement of the system of the disclosure and scanned using a preferred embodiment of the method of the disclosure. Each container C was also scanned using a prior art system manufactured by a leading RFID portal manufacturer having fixed antennas. Each scan result for each container C were printed and attached to each container C having stored therein an unknown quantity of laundry L. A hand count of each container C was then performed. For the first container, the prior art RFID portal scan indicated a quantity of laundry L of 343 pieces and the exemplary system of the disclosure counted 281 pieces. After hand-counting the items in the cart, the actual quantity was determined to be 282. A further investigation of the first container C, by individually scanning each piece of laundry L for its RFID tag revealed one defective tag in container C and a 100% accuracy of the exemplary system of the disclosure using the method of the disclosure, at least with respect to the counting of RFID tags contained within container C. This compares to the 21.6% over-reading margin of error for the prior art portal. The findings for each of the remaining four carts were similar, both in the exemplary system of the disclosure and the prior art system, and all readings using the exemplary portal and antenna arrangement of the system of the disclosure yielded accuracy ratings of greater than 98.7%. One skilled in the art of inventory management and/or intake counting will appreciate that either variation from accurate count, whether positive or negative, should be avoided, if possible. Undercount of inventory at intake may have several problems, including but not limited to decrease in invoiced amounts for per-unit services performed. Overcount of inventory at intake may also have several problems, including but not limited to mistaken accounting of shrink during a service process (i.e., the mistaken accounting in lost inventory during processing when more are accounted for at intake than were actually present). Even if, in the short term, it may be more profitable to account for an increase in units received when performing services on a per-unit basis, re-delivery in a decreased quantity could result in compensation for goods never received, and therefore, never lost. Further, the ethical and contractual issues related to charging a customer for more work than was performed may be implicated if overcounting exists at intake.

With respect to the above description then, it is to be realized that the optimum dimensional relationships, to include variations in size, materials, shape, form, position, function and manner of operation, assembly, type of sensor/emitter (RFID, NFC, barcode, etc.), shape of portal 100 (cubic, prismed, cylindrical, tubular, arched, etc.), shape of antenna 410, and use, including use with any object capable of being tagged with RFID, are intended to be encompassed by the present disclosure.

It is contemplated herein that the device may include a variety of overall sizes and corresponding sizes for and of various parts, including but not limited to: portal structure, skins, doors, ceiling, walls, antenna assemblies, cables, hubs, computers, monitors, and PLCs, or various electronic components to accommodate different needs. Furthermore, it is contemplated that due to variations in objects and/or living things passing through a portal of the invention, that a variety of considerations may be considered in regard to portal size and component size preferences. Portals accommodating smaller objects may be made of smaller components and larger portals may be preferred for larger objects. Yet still, though the inventor has contemplated one method of arranging and articulating/controlling RFID sensing antennas, the disclosure is not limited to a single portal, antenna arrangement/position and movement/control technique. These may include increasing the total number of antennas, increasing the speed of antenna rotation, increasing the rotational angle of the antennas beyond 180 degrees, changing the antenna movement mechanism (e.g., sliding, revolving, vibrating), changing the motorization involved (e.g., belt-driven, hydraulic, geared motor, hand crank), the like, and/or combinations thereof. It is also contemplated that certain considerations and/or additional features of the present disclosure may improve the functionality. These may include the addition of cameras, imaging technology, predictive modelling, artificial intelligence, the like, and/or combinations thereof to better calibrate antenna angle prior to an object's entry into the portal. In regard to communication with other devices via a network, the devices, including the antennas and antenna arrays, may communicate via any known or yet to be discovered protocol, including wired signaling, wired networking, fiber optic communication, wireless networking (i.e., WiFi), near field communication (e.g., Bluetooth® or NFC), the like or combinations thereof. The device may receive power from any known method, including but not limited to an outlet designed for consumer or commercial electronics or a battery which may or may not have the capability to re-charge.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A Radio-Frequency Identification (RFID) portal comprising:
   a first opening and a second opening;
   a target detection zone therebetween said first opening and said second opening;
   an antenna assembly positioned to scan said target detection zone, the antenna assembly comprising:
      an at least one RFID tag reading antenna having an RFID scanning feature; and
      an at least one actuator, said at least one actuator capable of moving said at least one RFID tag reading antenna in a direction;
   wherein said at least one actuator, during a motion of the at least one RFID tag reading antenna, does not emit an electromagnetic radiation therebetween said RFID tag reading antenna and the RFID tag, and said at least one RFID tag reading antenna is configured to activate said RFID scanning feature during said motion.

2. The RFID portal of claim 1, wherein the at least one RFID tag reading antenna is a three-antenna array having a first RFID tag reading antenna, a second RFID tag reading antenna, and a third RFID tag reading antenna.

3. The RFID portal of claim 2, further comprising an articulating arm having a face, a rear, a first end, a second end, and a center, wherein the three-antenna array is affixed to said articulating arm, the articulating arm is affixed at said center of said rear to a point of actuation on the at least one actuator.

4. The RFID portal of claim 3, wherein the first RFID tag reading antenna is attached proximate the first end of the face of the articulating arm, the second RFID tag reading antenna is attached proximate the second end of the face of the articulating arm, and the third RFID tag reading antenna is attached proximate the center of the face of the articulating arm.

5. The RFID portal of claim 4, wherein the first and the second RFID tag reading antennas face inwardly toward the third RFID tag reading antenna and the target detection zone.

6. The RFID portal of claim 5, wherein the at least one actuator is from a group of actuators, the group of actuators consisting of a hydraulic rotary actuator and a pneumatic rotary actuator.

7. The RFID portal of claim 6, further comprising an RFID portal, said RFID portal having a roof panel, a front panel having an opening, a rear panel, a first side panel and a second side panel, wherein the target detection zone is proximate the center of the RFID portal.

8. The RFID portal of claim 7, further comprising a second antenna assembly and a third antenna assembly, wherein the antenna assembly is mounted to the roof panel interior the RFID portal, said second antenna assembly is mounted to the second side panel interior the RFID portal and said third antenna assembly is mounted to the first side panel interior the RFID portal, wherein said second antenna assembly comprises a second set of three RFID tag reading antennas mounted to a second articulating arm which is affixed to a second actuator and said third antenna assembly comprises a third set of three RFID tag reading antennas mounted to a third articulating arm which is affixed to a third actuator.

9. The RFID portal of claim 8, further comprising a door at said opening of said front panel, the door capable of opening and closing the opening.

10. The RFID portal of claim 9, wherein the roof panel, the front panel, the door, the rear panel, the first side panel and the second side panel are constructed of an electromagnetic shielding material.

11. The RFID portal of claim 10, further comprising an interior roof panel parallel the roof panel, a first interior side panel parallel the first side panel and a second interior side panel parallel the second side panel.

12. The RFID portal of claim 11, wherein the interior roof panel, the first interior side panel, and the second interior side panel are each constructed of a material transparent to electromagnetic radiation.

13. The RFID portal of claim 6, further comprising:
a roof panel;
a front panel having said opening with a door capable of opening and closing;
a rear panel;
a first side panel;
a second side panel;
an interior roof panel parallel said roof panel;
a first interior side panel parallel said first side panel; and
a second interior side panel parallel said second side panel
wherein the target detection zone is proximate the center of the RFID portal.

14. The RFID portal of claim 13, wherein the roof panel, the front panel, the door, the rear panel, the first side panel, the second side panel are each constructed of an electromagnetic shielding material and the interior roof panel, the first interior side panel, and the second interior side panel are each constructed of a material transparent to electromagnetic radiation.

15. The RFID portal of claim 13, wherein the roof panel, the front panel, the door, the rear panel, the first side panel, the second side panel are each constructed of a metal and the interior roof panel, the first interior side panel, and the second interior side panel are each constructed of a plastic.

16. The RFID portal of claim 14, wherein the antenna assembly is installed therebetween the roof panel and the interior roof panel.

17. The RFID portal of claim 14, wherein the antenna assembly is installed therebetween the roof panel and the interior roof panel, and further comprising a second antenna assembly installed therebetween the first side panel and the first interior side panel and a third antenna assembly installed therebetween the second side panel and the second interior side panel, said second antenna assembly having a second at least one RFID tag reading antenna and a second at least one actuator, said second at least one actuator capable of moving said second at least one RFID tag reading antenna in a direction and said third antenna assembly having a third at least one RFID tag reading antenna and a third at least one actuator, said third at least one actuator capable of moving said third at least one RFID tag reading antenna in a direction.

18. The RFID portal of claim 6, wherein the direction is radially around the point of actuation.

19. A method of Radio-Frequency Identification (RFID) tag scanning a target detection zone, the method comprising:
providing an RFID portal having a first opening, a second opening, and the target detection zone therebetween said first and said second opening, the portal having there installed a tag reading antenna having an RFID scanning feature and having an at least one actuator, said at least one actuator capable of moving said at least one RFID tag reading antenna in a direction without emitting an electromagnetic radiation;
placing a container proximate the target detection zone, said container having stored therein a plurality of objects, the plurality of objects each having installed thereon a single RFID tag from a plurality of RFID tags;
activating the RFID scanning feature of the at least one RFID reading antenna;
activating the at least one actuator causing the at least one actuator to move the RFID reading antenna in the direction during a scan; and
obtaining a reading of RFID tags therein the container.

20. The method of claim 19, wherein the RFID portal further comprises a roof, a front panel with said first opening and a door, a rear panel, a first side panel, and a second side panel, the at least one RFID tag reading antenna installed therein said RFID portal wherein the container is placed within the RFID portal.

* * * * *